United States Patent [19]

Bodner

[11] 4,117,536
[45] Sep. 26, 1978

[54] INSTRUCTION PROCESSING CONTROL APPARATUS

[75] Inventor: Ronald Eugene Bodner, Rochester, Minn.

[73] Assignee: International Business Machines Corporation, Armonk, N.Y.

[21] Appl. No.: 754,373

[22] Filed: Dec. 27, 1976

[51] Int. Cl.² ............................................. G11C 8/00
[52] U.S. Cl. .................................................. 364/200
[58] Field of Search ... 364/200 MS File, 900 MS File, 364/200

[56] References Cited

U.S. PATENT DOCUMENTS

| | | | |
|---|---|---|---|
| 3,292,151 | 12/1966 | Barnes et al. | 364/200 |
| 3,594,732 | 7/1971 | Mendelson et al. | 364/200 |
| 3,737,860 | 6/1973 | Sporer | 364/200 |
| 3,753,242 | 8/1973 | Townsend | 364/200 |

*Primary Examiner*—Gareth D. Shaw
*Assistant Examiner*—Thomas M. Heckler
*Attorney, Agent, or Firm*—Donald F. Voss

[57] ABSTRACT

A register control instruction is added in a stored program computer and uses the same OP code as used for an existing storage instruction. A non used bit state in the existing storage instruction identifies the instruction as a register control instruction rather than a storage instruction and causes logic to generate a control signal for inhibiting the storage operation whereby the storage address is used for addressing a register instead of storage and data is transferred to or from the addressed register as per other control information in the instruction. The bit state identifying the instruction as a register control instruction is converted to a used bit state of the storage instruction so as to invoke an address update operation normally invokable by the storage instruction to update the storage address used instead for register addressing.

9 Claims, 16 Drawing Figures

| CLOCK (200ns) | T0 | T1 | T2 | T3 | T4 | T5 | T6 |
|---|---|---|---|---|---|---|---|
| REGISTER CONTROL | | | | | | | |
| SENSE/LOAD | | | | | | | |
| SELECT STG GT H/L=LSR H/L | | | | ▬ | | | |
| SELECT LSR 13-14-15 | | | | ▬ | | | |
| CLK X H/L – SAR | | | | – | | | |
| CLK STG GT CHK | | | | – | | | |

| READ | | | | | | | | |
|---|---|---|---|---|---|---|---|---|
| SELECT LSR 13-14-15 | | | | | ▬ | | |
| ALU (-1) BITS (11) (1̄2̄) | | | | – – | ▬ | | |
| ALU GT H/L = ALU H/L | | | | – – | ▬ | | |
| FETCH | | | | | | | |
| CLK SDR (CSY TGR) | | | | | | – | |
| CLK STG GT CHK | | | | | | | – |
| SELECT STG GT H = SDR H | | | | | | | ▬ |
| SEL ALU GT L = STG GT L | | | | – – | | | ▬ |
| SEL ALU GT H = ALU GT L (1̄0̄) | | | | – – | | | ▬ |
| SEL ALU GT H = STG GT H (10) | | | | – – | | | ▬ |
| SEL STG GT L = SDR L | | | | | | – – | ▬ |
| SELECT LSR 5-6-7 | | | | | | | ▬ |
| WRITE LSR H/L | | | | | | – | |
| WRITE LSR H (4+10) | | | | | | | – |
| WRITE LSR L (4̄+10) | | | | | | | – |
| CLK ALU GT CHK | | | | | | – | – |

| WRITE | | | | | | | | |
|---|---|---|---|---|---|---|---|---|
| SELECT LSR 5-6-7 | | | | | ▬ | ▬ | |
| SELECT STG GT H = LSR H | | | | | ▬ | ▬ | |
| SEL STG GT L = LSR L (4̄+10) | | | | | ▬ | ▬ | |
| SEL STG GT L = STG GT H (1)(1̄0̄) | | | | | ▬ | ▬ | |
| STORE | | | | | | | |
| WRITE STG LOW | | | | | ▬ | ▬ | |
| CLK SDR (CSY TGR) ECHO CHK | | | | | | – | |
| CLK STG GT CHK | | | | | | – | |
| ALU (-1) BITS (11) (1̄2̄) | | | | – – | – – | | |
| ALU GT H/L = ALU H/L | | | | – – | – – | | |
| SELECT LSR 13-14-15 | | | | | | | ▬ |
| WRITE LSR H/L | | | | | | | – |
| CLK ALU GT CHK | | | | | | | – |
| WRITE CONT/STATUS REG'S | | | | | ▬ | | |

FIG. 6

INSTRUCTION PROCESSING CONTROL APPARATUS

BACKGROUND OF THE INVENTION

1. Field of the Invention

This invention relates to control apparatus in a stored program computer and more particularly to instruction processing control apparatus.

The present invention finds particular utility in computer systems which have been modified to expand the function thereof by addition of control registers. These additional control registers can be loaded or sensed by the present invention without constructing special storage to register instructions. In a sense the present invention extends register addressing capability in an existing computer system without expanding the size of the instructions. Hence, the added control registers can be addressed for transfer of data thereto or therefrom. The present invention uses substantially the same decode circuitry as used for an existing storage control instruction. Hence, the present invention eliminates extensive additional decode circuitry which would be otherwise required if special storage to register instructions were used.

The registers added to expand the function of the computer system could be, for example, to provide address translation. If address translation is provided, mode control registers might be added to control the translate mode. Normally a special instruction would be required to load or sense the address translation registers and another special instruction would be required to load or sense the mode control registers. The register control instruction of the present invention can load or sense the address translation registers and the mode control registers.

2. Prior Art

Heretofore, it has not been the practice to use the same OP code for two different instructions and inhibit the operation specified by the OP code and perform a different operation using substantially the same control circuitry as used for the inhibited operation. Use of predecoders and function modifiers is well known in the prior art as represented by U.S. Pat. Nos. 3,657,705 and 3,889,242. The prior art, as represented by a publication in the IBM Technical Dislosure Bulletin, Vol. 8, No. 12, May, 1966, Page 1751, also teaches expanding an instruction set by providing a special instruction within the basic instruction set which switches the system into an alternative mode where an instruction in one mode has one meaning and another meaning in the alternative mode. Hence, not only are special instructions required, but new control circuitry responsive to the instruction meaning in the alternative mode is also required.

SUMMARY OF THE INVENTION

The principal objects of the invention are to provide additional register addressing capability in a computer system which:

(a) does not require expansion of the size of existing instructions to acquire the additional register addressing capability;

(b) does not require special instructions for addressing specific registers; and (c) provides the expanded register addressing capability with minimal additional logic.

The foregoing objects are achieved by using a storage control instruction for expanded register addressing. A normally unused bit state in the storage control instruction is used to distinquish the register control instruction from the storage control instruction and cause storage accessing to be inhibited. The address which is selected to address storage is used instead to address a set of registers and data is transferred to or from the addressed register according to other control information in the instruction during the storage operation which is taking place without storage being accessed. Further, the address is incremented or decremented by modifying the bit state of the bit indicating that the instruction is a register control instruction instead of a storage control instruction. The modified bit state is fed back into the circuitry normally used to increment or decrement the storage address. The data source or destination specified by the register control instruction is accessed by the same circuitry invoked by the storage control instruction.

BRIEF DESCRIPTION OF THE DRAWINGS

FIG. 6 is a timing diagram illustrating the timing signals involved during execution of a register control instruction;

DETAILED DESCRIPTION

Figure 1:
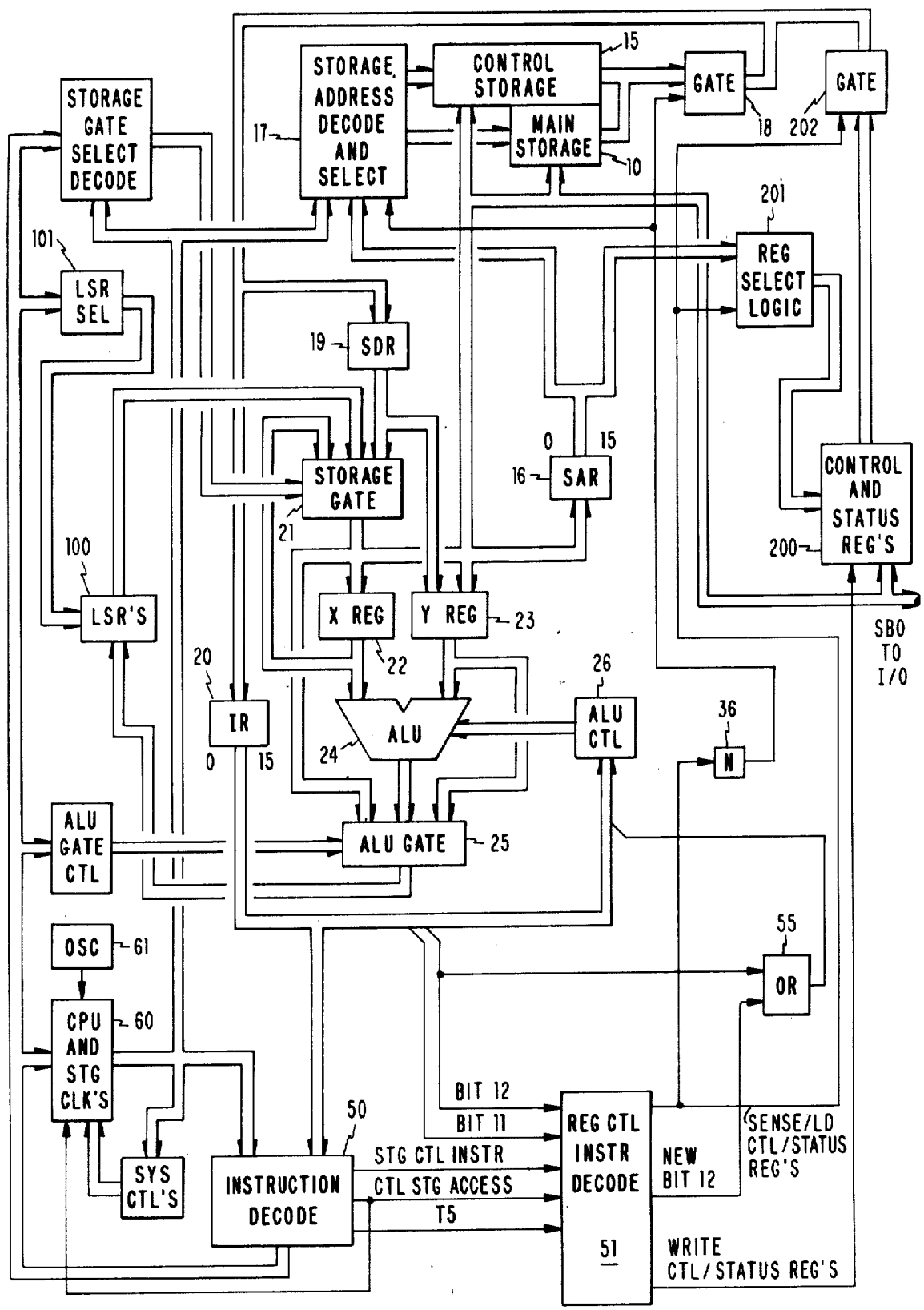
FIG. 1 is a schematic block diagram illustrating the invention as incorporated in a computer system.

With reference to the drawings and particularly to FIG. 1 the invention is illustrated by way of example as being incorporated in a computer system including a modified IBM System/32 processor. The IBM System/32 processor is set forth in a manual entitled "IBM Maintenance Library System/32 Theory-Diagrams," copyrighted 1975 by International Business Machines Corporation, Form. No. SY31-0346-0 which is incorporated herein by reference. The modified IBM System/32, FIG. 1, includes main storage 10 and control storage 15. Main storage 10 contains system language instructions and data whereas control storage 15 contains microinstructions and data. A single storage address register (SAR) 16 is used for addressing both main storage 10 and control storage 15 via storage address decode and select logic 17. The IBM System/32 is modified whereby the storage address in register 16 can also address control and status registers 200. The address in register 16 is passed to storage address decode circuitry 17 and to register select logic 201. Register select logic 201 is active only if there is a Sense/Load CTL/Status REGs signal from register control instruction decode logic 51.

Figure 3:
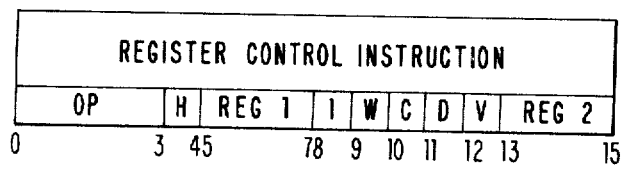
FIG. 3 is a diagram illustrating the format of a register control instruction executable by the computer systems of FIGS. 1 and 2.

The source of the address for register 16 is from a local storage register of LSRs 100. The local storage register of LSRs 100 is selected by bits 13-15 inclusive of the register control instruction shown in FIG. 3. These bits are referred to as REG 2. The register control instruction is fetched from control storage 15 and entered into storage data register 19 and instruction register 20. Bits 13-15 inclusive in register 20 are passed by the instruction decode circuitry 50 to the LSR select logic 101. These bits are then decoded by the LSR select logic 101 to select one of the local storage registers of LSRs 100. The selected LSR was loaded with the desired address by executing a storage direct instruction prior to fetching the register control instruction. The address in the selected LSR is transferred to SAR 16 via storage gate 21.

The data to be entered into one of the selected control or status registers 200 durng a load operation comes from one of the LSRs 100. Conversely, during a sense operation the data in one of the control or status registers 200 to be sensed is transferred into one of the selected LSRs 100. The selected LSR 100 is identified by bits 5-7 inclusive of the register control instruction. These bits are passed from instruction register 20 to instruction decode 50 which in turn passes the bits to the LSR select logic 101. Assuming a load operation the contents of the selected LSR 100 are passed via storage gate 21 to the control and status registers 200. Storage gate 21 feeds main storage 10, control storage 15, SAR 16, X Register 22, Y Register 23, ALU Gate 25 and Control and Status Registers 200; however data is entered into these destinations only if there is an accompanying write signal. The Write CTL/Status REGs signal is active during execution of a write register control instruction for loading data into the addressed register of registers 200. If the operation is a sense operation, the data from the addressed register of registers 200 is passed via gate 202 onto the storage bus and into storage data register 19. The data then passes from register 19 via storage gate 21, to ALU gate 25 and from there to the LSR 100 selected by bits 5-7 of the register control instruction. The Sense/Load CTL/Status REGs signal from the register control instruction decode logic 51 conditions gate 202 and inhibits gate 18 via inverter 36 during execution of a sense register control instruction. With gate 18 inhibited data cannot be entered into SDR 19 from either main storage 10 or control storage 15.

During execution of a register control instruction the instruction decode logic 50 decodes the OP code bits 0-3 of the register control instruction in instruction register 20. Since the OP code for the register control instruction is the same as the OP code for a storage instruction, instruction decode logic 50 generates a storage control instruction signal STG CTL INSTR which is applied to the register control instruction decode logic 51. The register control instruction decode logic 51 also is responsive to bits 11 and 12 of the register control instruction in instruction register 20. Bit 11 of the register control instruction indicates whether the address in the selected LSR, i.e., the LSR specified by bits 13-15 of the register control instruction, should be incremented or decremented. Bit 11 has the same meaning for the register control instruction as it does for a storage instruction, i.e., bit 11 indicates whether the address in the LSR specified by bits 13-15 should be incremented or decremented. If bit 11 is 0 the address is incremented and if it is 1 the address is decremented. Bit 12 in a storage instruction indicates the amount that the address in the LSR specified by bits 13-15 should be incremented or decremented. If bit 12 is zero the address is not incremented or decremented. If bit 12 is one the address is incremented or decremented by one. The register control instruction exists rather than a storage instruction when bit 11 is one and bit 12 is zero. This bit combination has no meaning for the storage instruction in the IBM System/32.

The register control instruction signal Sense/Load CTL/Status REGs from decode 51 is used together with a timing signal T5 to form a Write CTL/Status REGs signal which is applied to control and status REGs 200 for clocking data therein as it comes from the selected LSR 100 via storage gate 21. The Sense/Load CTL/Status REGs signal is also applied via inverter 36 to the storage address decode and select logic 17 for inhibiting entry of data into either main storage 10 or control storage 15.

Figure 4:
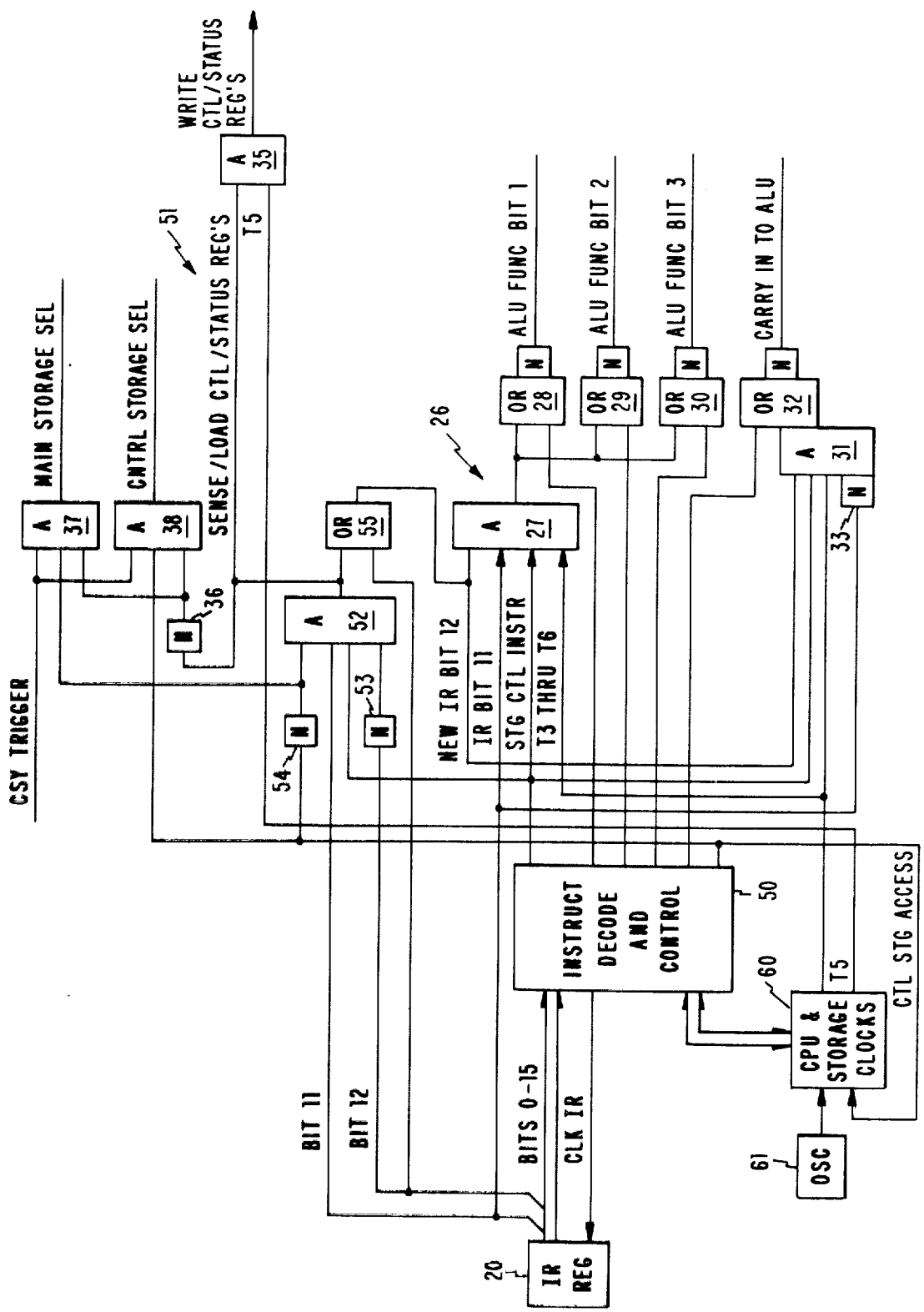
FIG. 4 is a logic diagram of the logic added to form the register control instruction decode circuit and the circuitry controlled by either the storage control instruction or the register control instruction for controlling the address increment or decrement function.

The details of the logic for decoding the register control instruction instead of a storage instruction are shown in FIG. 4. The contents of the instruction register 20 are applied to instruction decode and control logic 50. Decoding of the OP code represented by instruction register bits 0-3 inclusive generates the storage control instruction signal ST CTL INSTR. This signal is applied to AND circuit 52 of the register control instruction decode logic 51. Bit 11 from instruction register 20 is applied directly to AND circuit 52 and bit 12 is applied thereto via inverter 53. The control storage access signal CTL STG ACCESS from instruction decode and control logic 50 is absent at this time however the line carrying this signal is applied to inverter 54 which feeds AND circuit 52. Thus all of the inputs to AND circuit 52 are satisfied at this time and it passes the Sense/Load Control/Status REGs signal indicating that a register control instruction has been decoded. This signal is also applied to inverter 36 to inhibit a storage operation by inhibiting ANd circuits 37 and 38 and to OR circuit 55 together with bit 12 from instruction register 20 to form a new IR bit 12 which will be used for controlling the increment and decrement function in ALU control 26. In essence instruction register bit 12 which is zero for a register control instruction is inverted by inverter 53 so as to have the same meaning as bit 12 of a storage instruction. By this arrangement the ALU control logic 26, FIG. 1, for controlling ALU 24 for the incrementing or decrementing function is the same for the register control instruction as it is for the storage instruction.

The ALU control logic 26, FIG. 4, includes AND circuit 27 which receives the output of OR circuit 55, bit 11 from instruction register 20, the storage control instruction signal STG CTL INSTR from instruction decode and control logic 50, and a timing signal T3 THRU T6 from CPU and storage clocks 60. The output of AND circuit 27 is applied to OR circuits 28, 29, and 30 which also have inputs from instruction decode and control logic 50 for other instructions which involve the use of ALU 24. The outputs of OR circuits 28, 29, and 30 represent ALU function bits 1, 2, and 3 respectively. The new IR bit 12 is also applied to AND circuit 31 together with IR bit 11 via inverter 33, the T3

THRU T6 timing signal and the storage control instruction signal so as to provide a Carry In signal via OR circuit 32. OR circuit 32 also receives an input from instruction decode and control logic 50 for instructions other than the storage or register control instruction requiring use of ALU 24.

The Write CTL/status REGs signal for controlling the entry of data into the control and status registers 200 comes from AND circuit 35. AND circuit 35 receives the Sense/Load CTL/Status REGs signal from AND circuit 52 and a T5 timing signal from CPU and storage clocks 60. The logic in the storage address decode and select circuit 17, FIG. 1, for controlling entry of data into either main storage 10 or control storage 16 includes inverter 36 and AND circuits 37 and 38, FIG. 4. Inverter 36 is connected to receive the Sense/Load CTL/Status REGs signal from AND circuit 52 and its output is applied to AND circuits 37 and 38. Thus AND circuits 37 and 38 will be inhibited whenever a register control instruction is in instruction register 20. AND circuit 38 also receives the control storage access signal CTL STG ACCESS while AND circuit 37 receives the not control storage access signal via inverter 54. AND circuits 37 and 38 are active only when there is a CSY Trigger signal from the CPU and storage clocks 60.

Figure 7A:
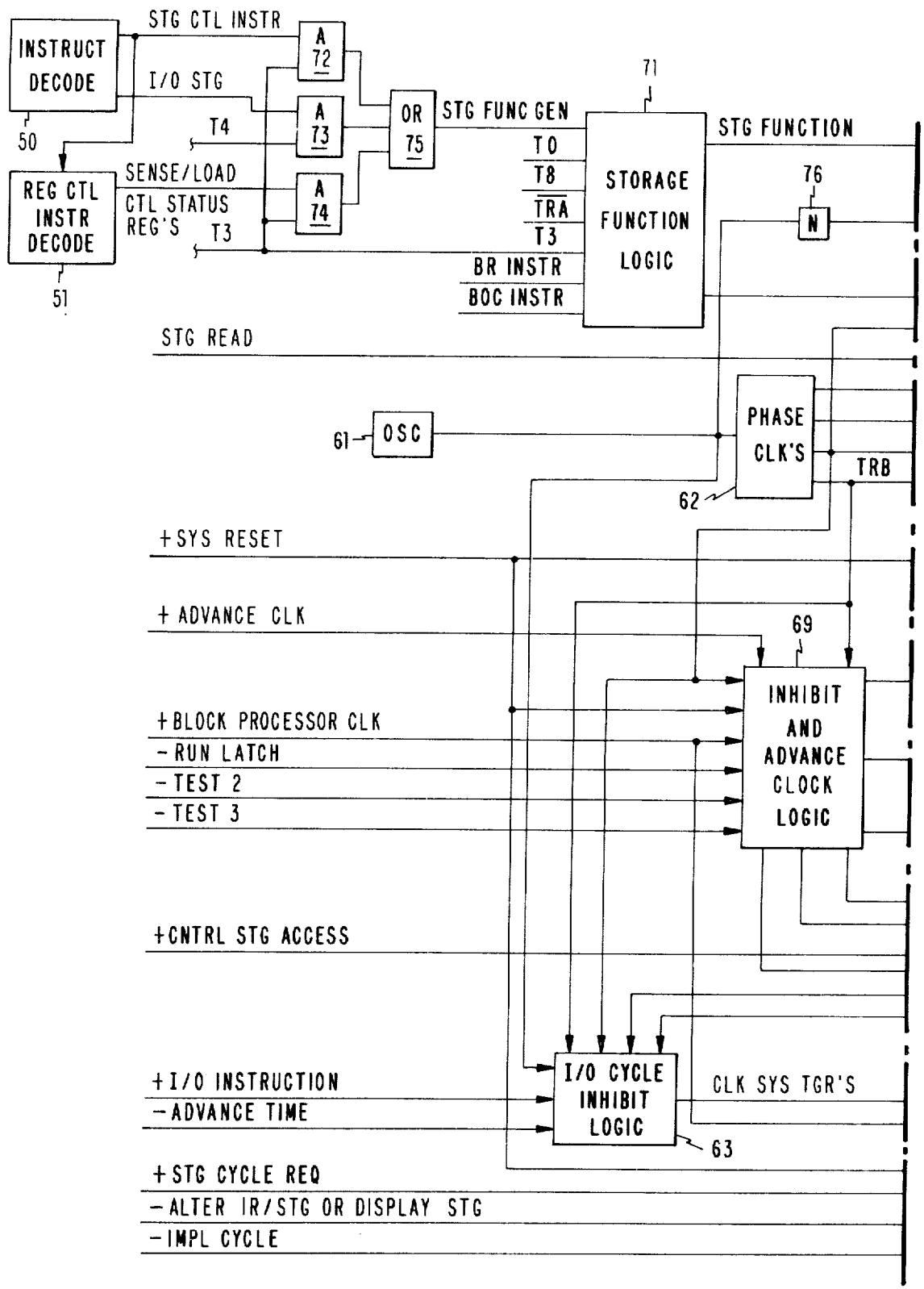
FIGS. 7a and 7b taken together with FIG. 7a disposed to the left of FIG. 7b are a circuit diagram of the CPU and storage clocks of FIG. 1.
Figure 7B:
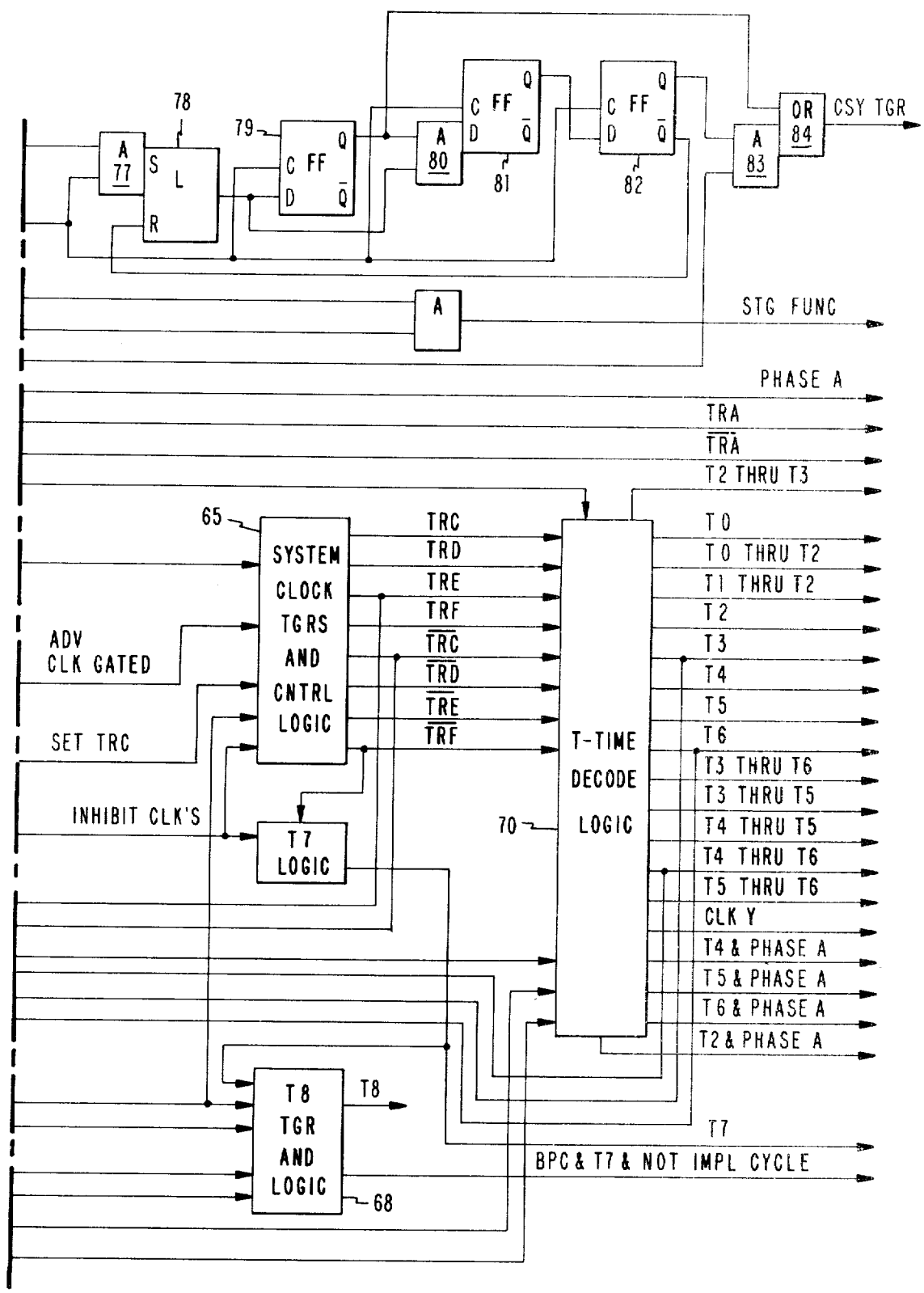

The CPU and storage clocks 60, FIGS. 7a and 7b include an oscillator 61 which provides pulses at a base frequency to phase clocks 62. The phase clocks 62 consist of a pair of triggers interconnected to generate trigger TRA and trigger TRB pulses. Not trigger A and trigger B pulses are applied to I/O cycle inhibit logic 63 which generates a clock system trigger signal CLK SYS TGRS. The CLK SYS TGRS signal, which temporarily suspends during an I/O instruction, is applied to the system clock triggers and control logic 65 and to T8 trigger and logic 68. The T8 trigger and logic 68 is not pertinent to the present invention and therefore will not be described further.

The system clock triggers and control logic 65 also receives control signals from the inhibit and advance clock logic 69. The system clock triggers and control logic 65 includes four triggers C, D, E, and F interconnected to provide inputs to T-time decode logic 70. The decode logic 70 decodes the outputs of these triggers to form timing pulses T0-T6 inclusive as well as combinations of these signals. The T times are used to provide timing signals during the fetching and execution of an instruction from control storage 15. Instructions are fetched starting at T0 time. The instruction fetch time continues through T2 time and instruction execution takes place starting at T3 time. Execution continues through T4, T5, and T6 times.

The T0 timing signal is fed into the storage function logic 71 so as to generate the storage function signal during T0 time to enable the fetching of an instruction from control storage 15. The address for fetching the instruction is loaded into SAR 16 from LSRs 100 during T0 time. The storage function logic 71 also receives timing signals T3, T8, and not TRA; instruction signals BR INST and BOC INST and a STG FUNC GEN signal, which is generated for storage and register control instructions via AND circuits 72, 73 and 74 and OR circuit 75.

The storage read signal STG READ is always generated at T0 time to facilitate the fetching of an instruction. The STG Read signal is applied to AND circuit 83 together with an output from trigger 82. The output of AND circuit 83 provides the CSY TRIGGER signal via OR circuit 84. The CSY TRIGGER signal is also used to clock the instruction from storage 15 into the instruction register 20. This takes place during T1 and T2 times. The instruction is decoded during the latter part of T2 time and the early part of T3 time. The storage function signal is generated at T3 time and SAR 16 is clocked during T3 time with the address coming from the selected LSR 100. Then depending upon the type of instruction the data from storage is clocked into storage data register (SDR) 19 with the CSY TRIGGER signal. The data in register 19 can then be passed directly into Y register 23 or to storage gate 21 which leads to the destinations previously described. The CSY TRIGGER signal is used during a register control instruction in substantially the same manner as it is used during a storage instruction.

AND circuit 83 is conditioned under control of trigger 82 which is clocked by the down level of the oscillator pulse via inverter 76. The data input of trigger 82 comes from write trigger 81. Trigger 81 is also clocked by the output of inverter 76 and its data input is under control of AND circuit 80. AND circuit 80 is conditioned by storage function latch 78 and it also receives the output of trigger 79. The output of trigger 79 is also directly applied to OR circuit 84 to provide the CSY TRIGGER signal. Trigger 79 is also clocked by the output of inverter 76 and its data input is connected to storage function latch 78. The storage function latch 78 is connected to be set under control of AND circuit 77 which receives the storage function signal and an input from inverter 76. The storage function latch 78 is reset when the trigger 82 is turned on. Once storage function latch 78 is reset the triggers 79, 81, and 82 which generate the storage timings are set to an off state through the clocking sequence.

Figure 5:
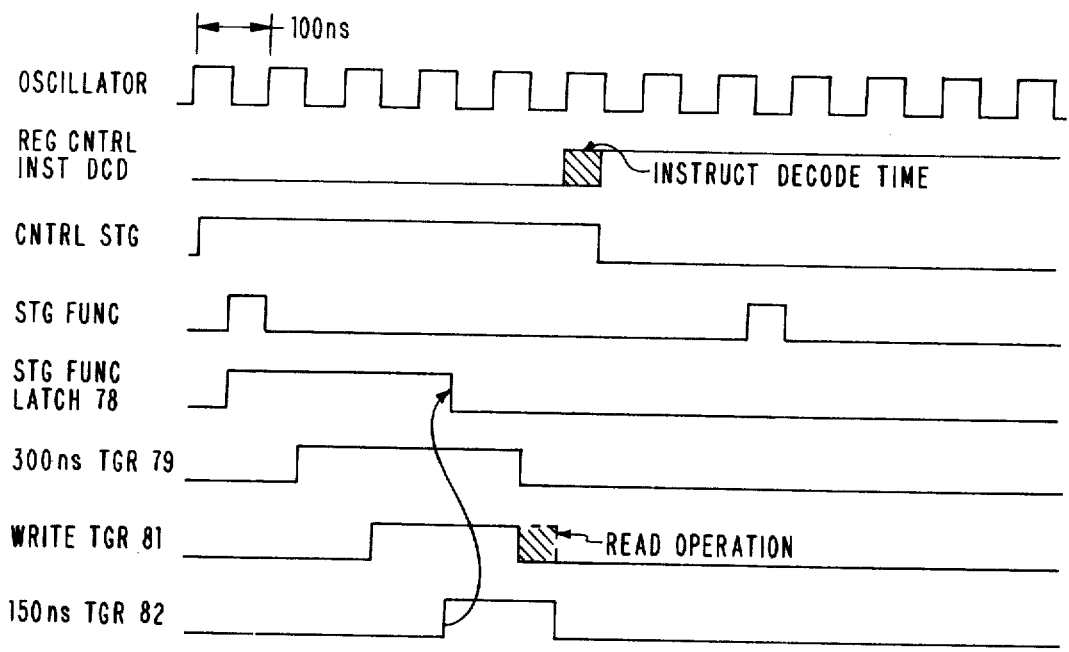
FIG. 5 is a timing diagram illustrating the storage clock sequence.

The storage clock sequence is illustrated in the timing diagram in FIG. 5. It is seen that the storage function latch 78 is set with the storage function signal when the oscillator pulse goes to a down level. The trigger 79 is then set when the next oscillator pulse goes to a down level. With trigger 79 set, trigger 81 becomes set when the next oscillator pulse goes to a down level. Trigger 82 then becomes set when the next oscillator pulse goes to a down level. The setting of trigger 82 resets the storage function latch 78. It is seen that the trigger 82 can extend the read operation even after trigger 79 becomes reset.

The timing diagram of FIG. 6 illustrates the action which takes place after a register control instruction has been fetched. The register control instruction is fetched during T0, T1, and T2 times. The register control instruction can be either a read or a write register control instruction. During a read register control instruction the contents of a selected control or status register 200 are transferred into a selected LSR register 100 and during a write register control instruction the contents of a selected LSR register 100 are written into a selected control or status register 200.

During the read register control instruction, data in the selected control or status register 200 is transferred first to the storage data register 19 and from there via the ALU gate 25 to a selected LSR 100. As seen in the timing diagram of FIG. 6, the LSR 100, FIG. 1, containing the address to be entered into SAR 16 is selected by bits 13, 14, and 15 of the instruction during T3 time and the contents of the selected LSR 100 are clocked into SAR 16 and X register 22. The address in SAR 16 is fed to storage address decode and select logic 17 and to the register select logic 201. The register select logic 201 is rendered active by the Sense/Load CTL/Status REGs signal and the data from the selected control or status register 200 is passed by gate 202 and clocked into the storage data register (SDR) 19 by the CSY TRIGGER signal during T4 and T5 time. The address in X register 22 is applied to ALU 24 and is decremented under control of ALU control 26 during T4 and T5 time. ALU 24 performs a decrementing operation when ALU function bits 1, 2, and 3 are zero and the carry in bit is zero. The register control instruction forces the ALU function bits 1, 2, and 3, and the carry in bit to zero. The decremented address is returned to the selected LSR via the ALU gate 25 during T5 time. The data in the storage data register (SDR) 19 then passes via storage gate 21 to ALU gate 25 and into a LSR 100 selected by bits 5, 6, and 7 of the instruction during T6 time.

A write register control instruction transfers data from a selected LSR 100 via storage gate 21 into a selected control or status register 200. The write register control instruction is fetched during T0, T1, and T2 times. The LSR containing the address to be entered into SAR 16 is selected during T3 time and the contents thereof are passed via storage gate 21 into SAR 16 and into X register 22. The contents of SAR 16 are then passed to the register select logic 201, rendered active by the Sense/Load CTL/Status REGs signal, which selects one of the control or status registers 200. The LSR 100 containing the data to be transferred is then selected during T4 and T5 time by bits 5, 6, and 7 of the instruction. The data passes from the addressed LSR via storage gate 21 and is clocked into the selected control or status register 200 during T5 time. The address in X register 22 is then decremented during T6 time by ALU 24 under control of ALU control 26. The decremented address passes via ALU gate 25 to the LSR 100 selected by bits 13, 14, and 15 of the instruction during T6 time.

Figure 8:
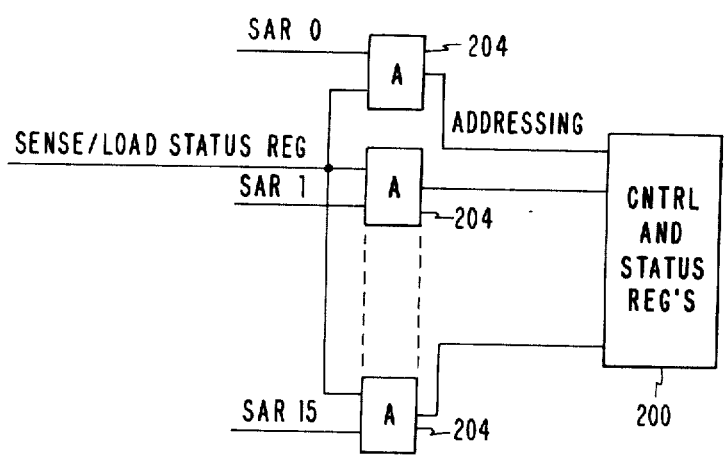
FIG. 8 is a logic diagram showing the details of the register selection logic in FIG. 1.

The addressing of control and status registers 200 is shown in FIG. 8. Bits 0–15 of SAR 16 are applied to AND circuits 204 of register select logic 201. These AND circuits are controlled by the Sense/Load Status REGs signal. It should be understood that the embodiment of the invention in FIG. 1 could be varied and still come within the scope of the invention as incorporated in a computer system such as a modified IBM System/32. For example, the output of SAR 16 could be applied to a pair of gates which would feed storage address decode and select logic 17, FIG. 1, and control and status registers 200, respectively. These gates would be substantially the same as gates 18 and 202 and would be controlled by the Sense/Load CTL/Status REGs signal which would be applied to the gate corresponding to gate 18 via inverter 36 and directly to the gate corresponding to gate 202. With this arrangement it is not necessary to gate the outputs from storages 10 and 15 and from registers 200.

Figure 2F:
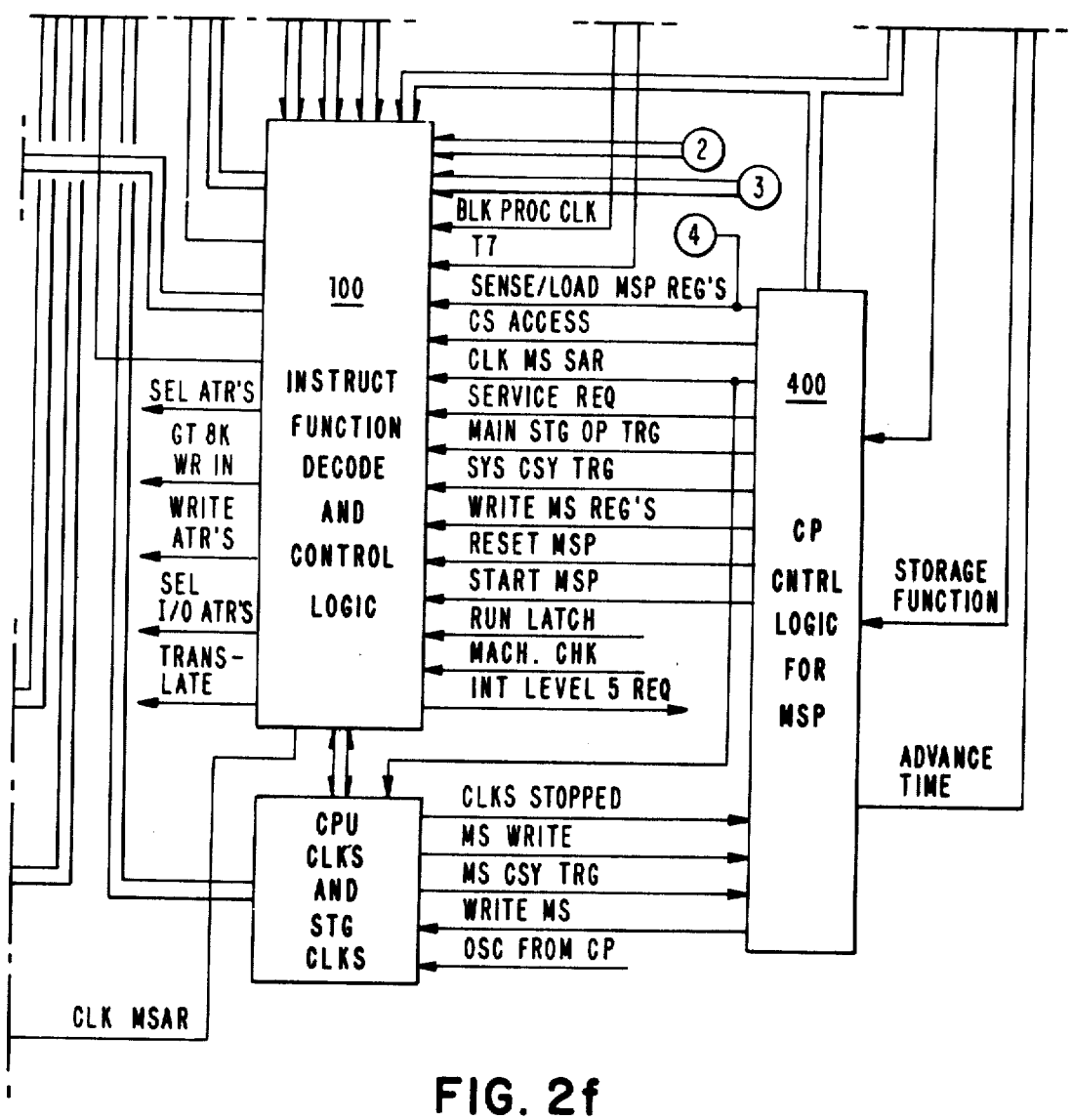
FIGS. 2a, 2b, 2c, 2d, 2e and 2f taken together are a block diagram of the invention embodied in a multiprocessor computer system.
Figure 2:
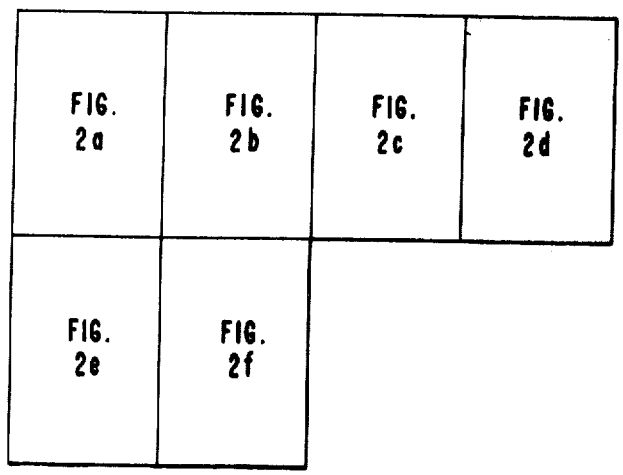
FIG. 2 is a diagram showing the arrangement of FIGS. 2a, 2b, 2c, 2d, 2e and 2f.
Figure 2A:
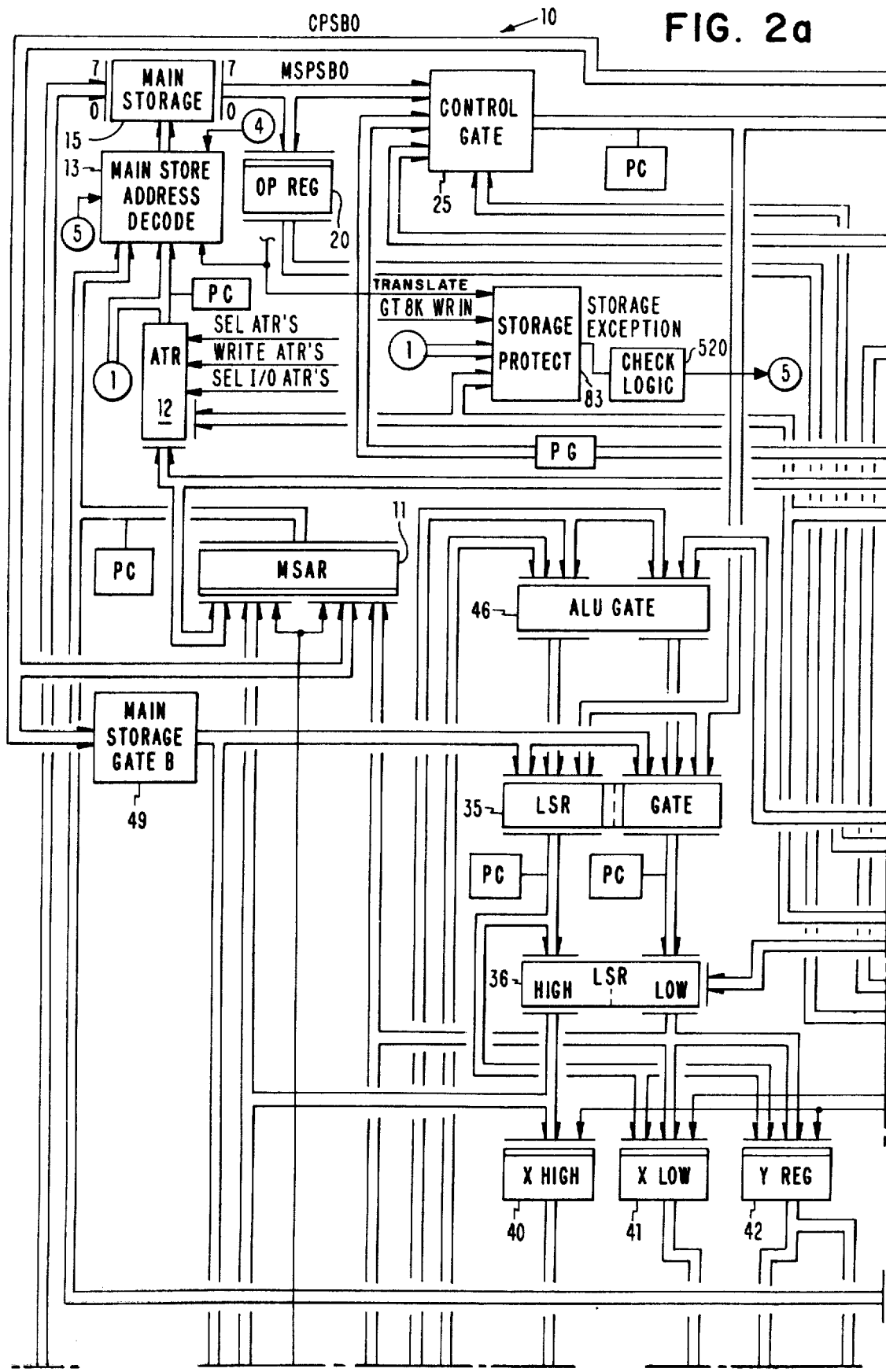
Figure 2B:
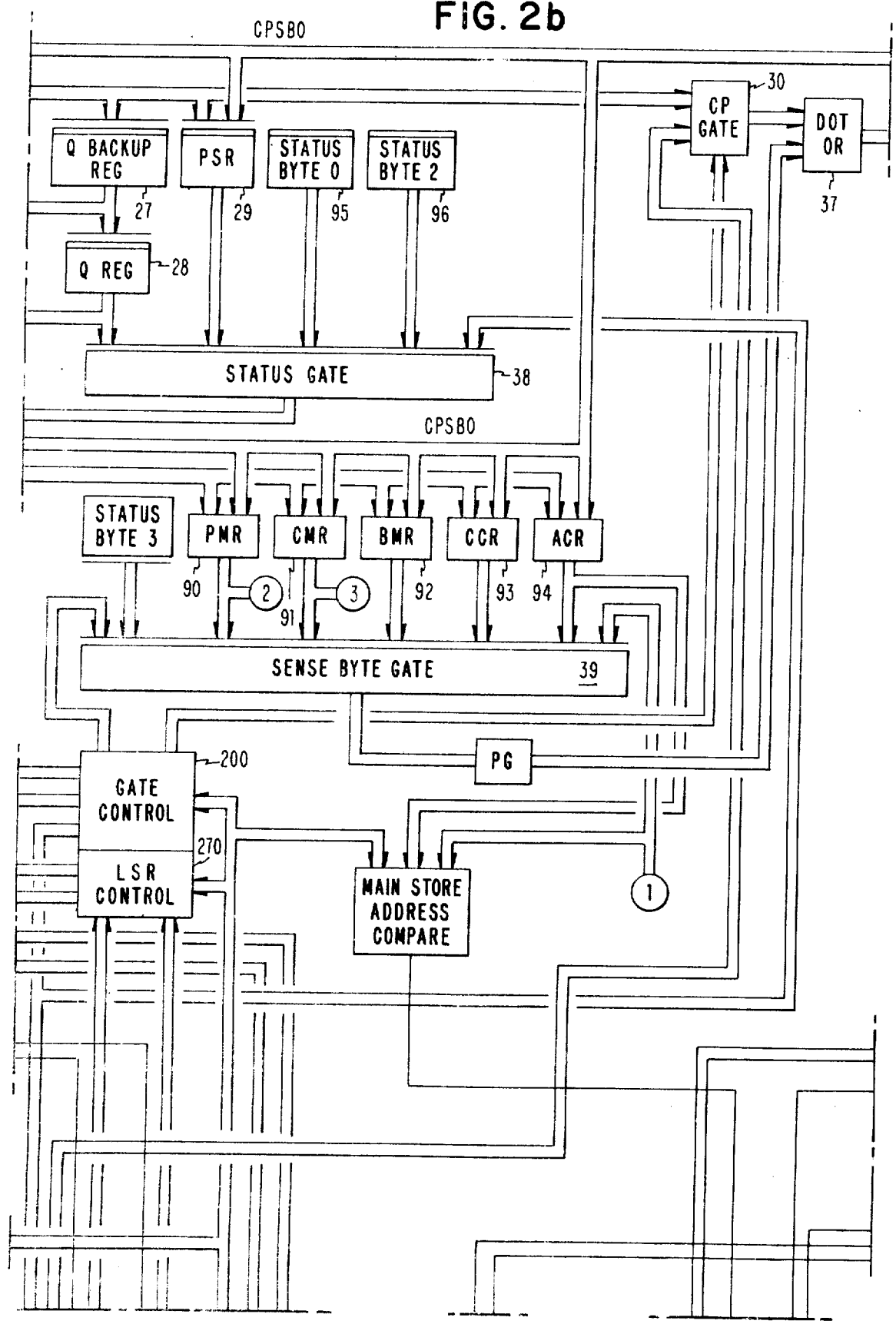

The invention embodied in a multiprocessor computer system is shown in FIGS. 2a, 2b, 2c, 2d, 2e, and 2f. The multiprocessor computer system embodying the invention is of the type shown and described in the commonly assigned copending application, Ser. No. 754,390, entitled "An Asymmetrical Multiprocessor System" by R. Bodner, et al. For convenience and cross-referencing the apparatus of FIG. 2 is identified with the same reference characters used in FIG. 2 of the referenced application. The instruction and function decode logic 350, FIG. 2d generates a Sense/Load MSP REGs signal which is transmitted from the control processor CP 300 to the gate control logic 200 in the main storage processor MSP 10 via CP control logic for MSP 400 and instruction function decode and control logic 100, FIGS. 2f and 2b.

During execution of a Sense/Load MSP REGs instruction in the CP 300 the not control storage access signal is generated and transmitted to the instruction function decode and control logic 100 of MSP 10. The CP CPU and storage clocks 330, FIG. 2d, are caused to loop so as to remain in a particular time state. The MSP 10 responds to the not control storage access signal whereby the MSP clocks 50, FIG. 2f, are stopped and a MSP Clocks Stopped signal is generated and transmitted to the CP control logic for MSP 400 of CP 300. The CP control logic for MSP 400 uses the MSP Clocks Stopped signal for synchronization and generates a main storage OP trigger signal which is transmitted to the instruction function decode and control logic 100 in the MSP 10. The main storage OP trigger signal is used within the CP control logic for MSP 400 to generate an Advance Time signal which is used to take the CP clocks 330 out of the loop state. The CP control logic for MSP 400 also gates a Clock MS SAR signal to the instruction function decode and control logic 100 of MSP 10. The CP places an address on CPSBO 313 which is then clocked into MSAR 11, FIG. 2a, in the MSP 10 by the CLK MSAR signal from instruction function decode and control logic 100 generated in response to receiving the clock MS SAR signal from CP 300. The address in the MSAR 11 is used in this instance for addressing one of the registers in the MSP 10 via gate control 200 and LSR control 270. LSR control 270 provides address lines for addressing the local store registers, LSR's 36, address translation registers 12, processor status register (PSR) 29, program mode register (PMR) 90, control mode register (CMR) 91, back up mode register (BMR) 92, configuration control register (CCR) 93, and address compare register (ACR) 94.

The control processor system bus out CPSBO feeds directly into MSAR 11, address translation registers 12, processor status register 29, program mode register 90, control mode register 91, back up mode register 92, configuration control register 93 and address compare register 94. The control processor system bus out CPSBO feeds the LSR's 36 via main storage gate 49 and LSR gate 35. The contents of the registers just mentioned can also be sensed by the CP 300 when it executes a Sense/Load MSP register instruction. Additionally the sense/load MSP register instruction can sense the contents of Q register 28, Q back up register 27, status byte zero register 95, status byte two register 96, and status byte three register 97.

The details of gate control 200 and LSR control 270 are not included herein because of the confusion it may cause with respect to the other drawings in this application. The details of control gate 200, however, are contained in FIGS. 5a, 5b, 5c, and 5d and the details of LSR control 270 are contained in FIGS. 6a and 6b of the referenced application. In any event, the address in MSAR 11 which normally addresses main storage 15 via main store address decode 13 is used during the register control instruction to address LSR's 36, ATR's 12, PSR 29, PMR 90, CMR 91, BMR 92, CCR 93 and ACR 94. The address entered into MSAR 11 is decremented in CP 300 in a manner substantially the same as described in connection with the processor of FIG. 1.

Figure 2C:
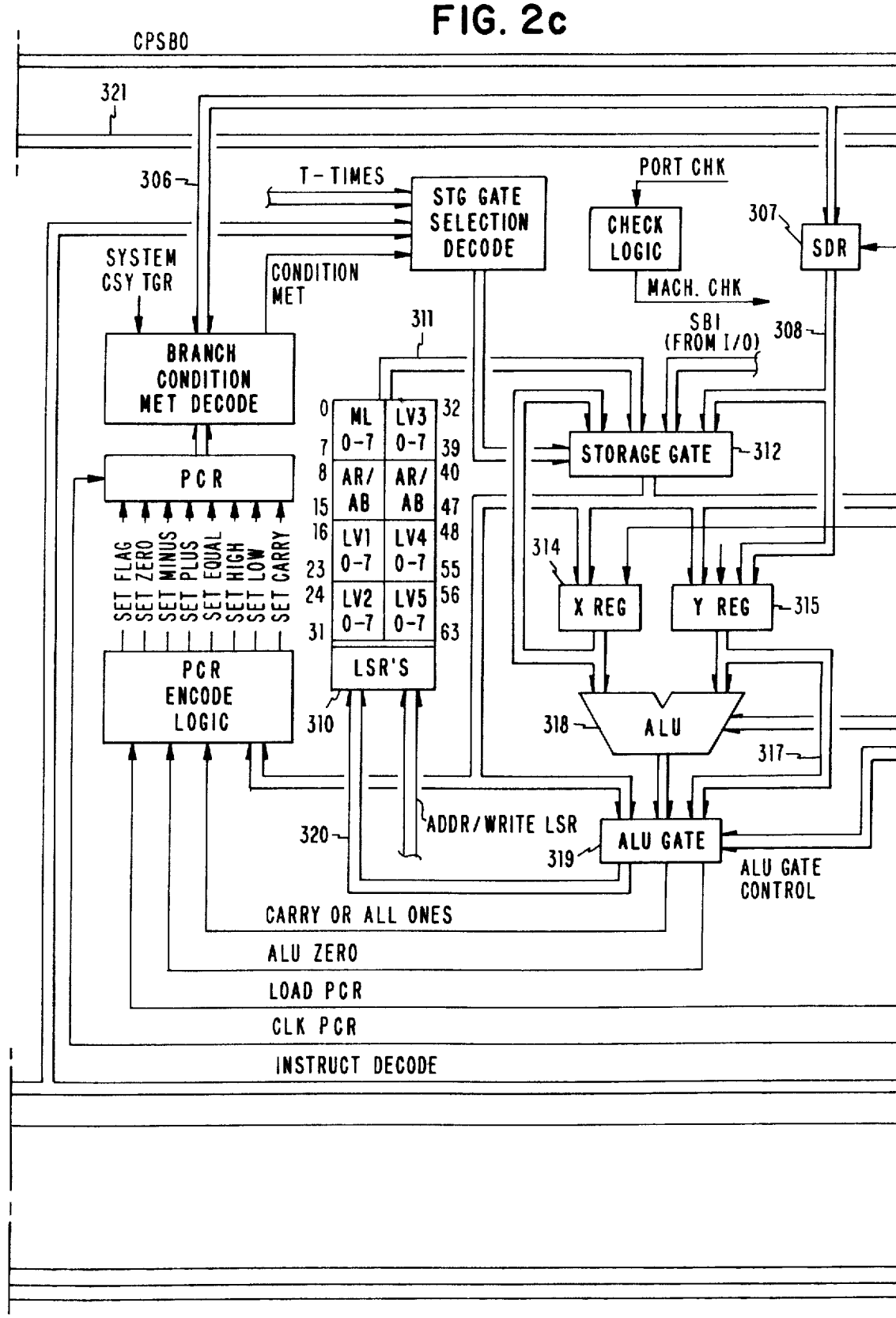
Figure 2D:
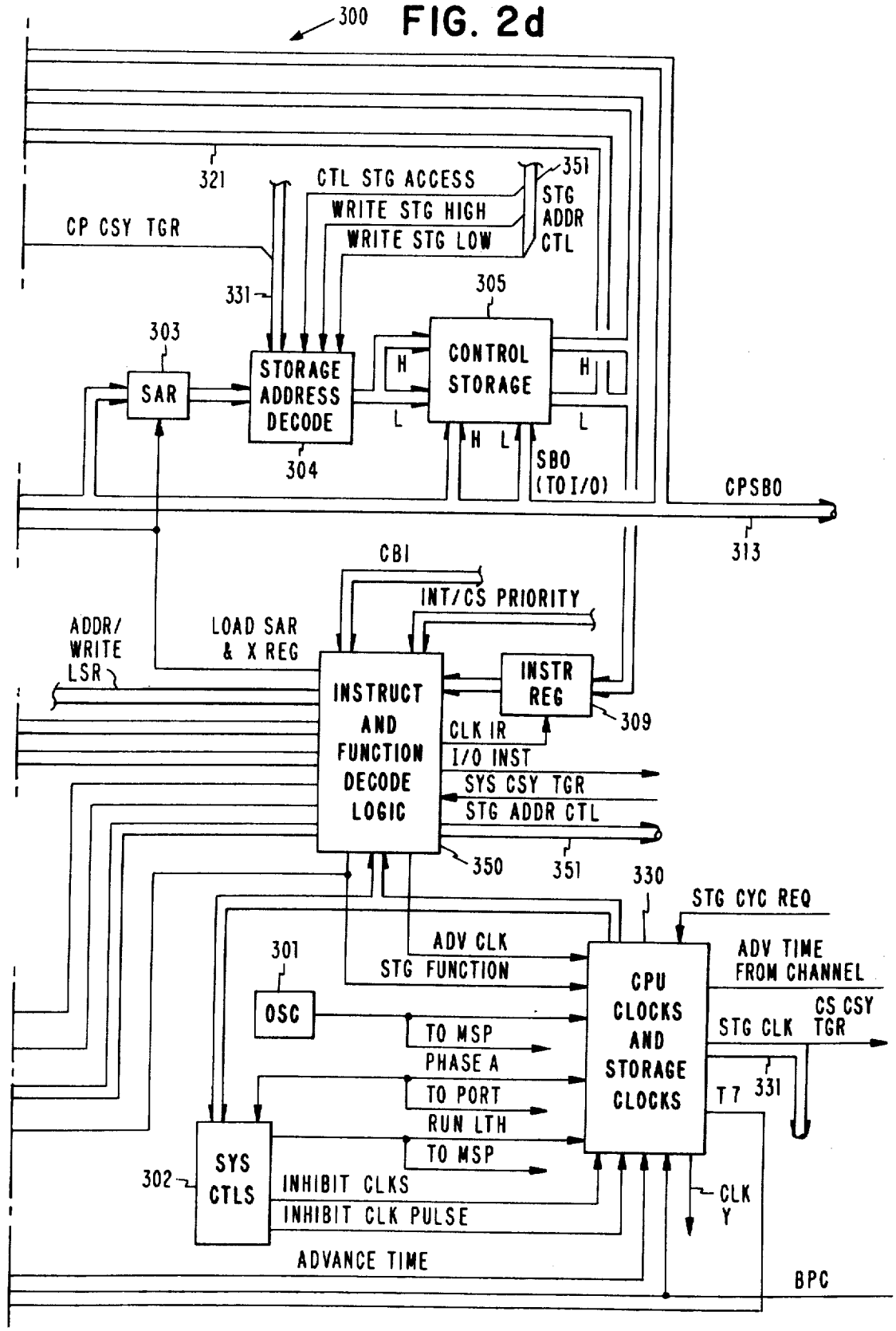
Figure 2E:
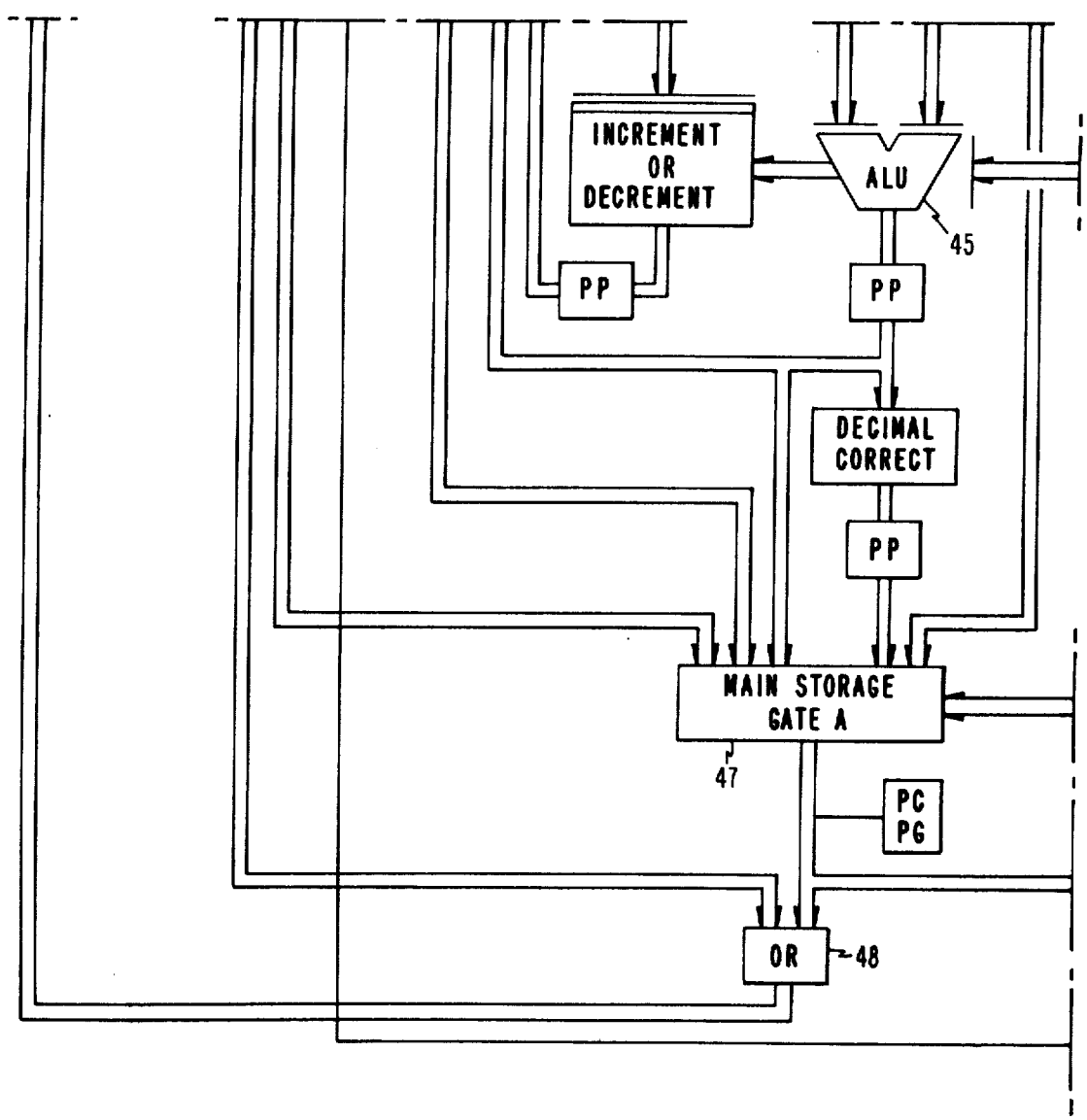

The address which was entered into MSAR 11 came from LSR's 310 via storage gate 312, FIG. 2c. This same address was entered into XREG 314 and from there passed to ALU 318. The address is then decremented by ALU 318 under control of ALU control signals from construction and function decoce logic 350. The decremented address is then returned to the selected LSR 310 via ALU gate 319. The LSR's 310 are selected by ADDR/Write LSR signals from instruction and function decode logic 350. The data to be entered into the selected register also comes from one of the LSR's 310 and is placed on CPSBO via storage gate 312. When data is to be sensed or read from the MSP registers and transferred to storage data register 307 of CP 300 via bus 312 which dots onto the control storage bus. Bus 300 is connected to dot OR 37 in FIG. 2b. Dot OR circuit 37 has inputs from control processor gate 30 and sense byte gate 39. Sense byte gate 39 is fed by the ATR registers 12, PMR 90, CMR 91, BMR 92, CCR 93, and ACR 94. Control processor gate 30 is fed by control gate 25. Control gate 25 is fed by status gate 38. Q register 28, PSR 29, and status registers 95 and 96 feed status gate 38. The data which is entered into SDR 307 is then stored in one of the selected LSR's 310 via storage gate 312 and ALU gate 319.

Figure 9:
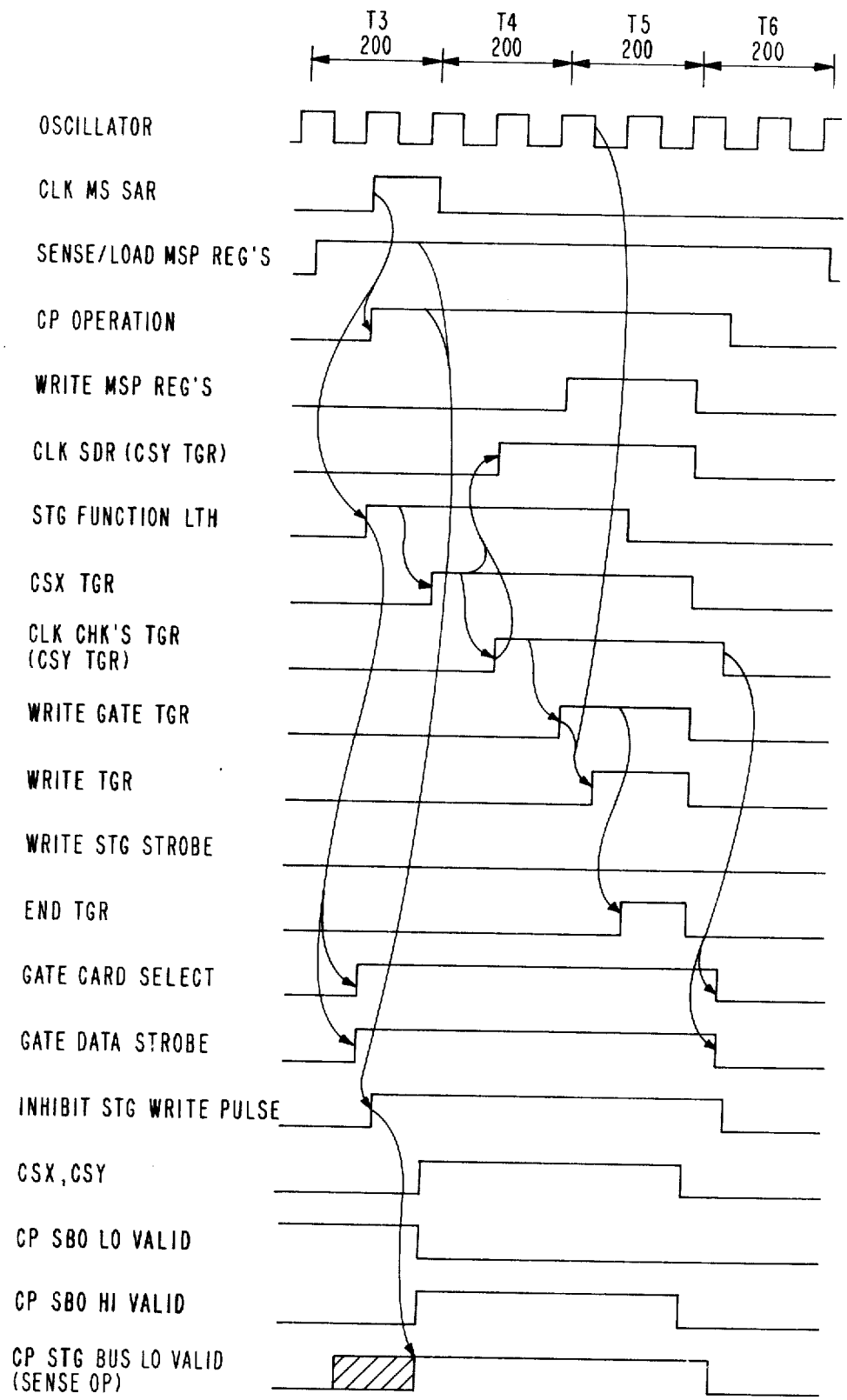
FIG. 9 is a timing diagram showing the timing signals involved during the execution of a register control instruction in the multiprocessor computer system of FIG. 2.

Although a storage address was placed in MSAR 11 during the execution of the register control instruction, main storage 15 is not addressed because the main store address decode circuitry 13 is inhibited by an Inhibit STG Write Pulse generated by the instruction function decode and control logic 100 in response to the sense/load MSP REGs signal. It is thus seen that the MSP registers are loaded and sensed by executing a register control instruction in CP 300. It is also seen that main storage 15 is inhibited during execution of the register control instruction in CP 300. Loading and sensing the MSP registers during execution of a register control instruction in CP 300 is substantially the same as loading and sensing the control and status registers 200 in FIG. 1. Also the inhibiting of the main store address decode circuit 13, FIG. 2a, so as to inhibit a main storage access during execution of a register control instruction is substantially the same as the inhibiting of storage address decode and select circuit 17 in FIG. 1. The timings of the signals involved during the sensing or loading of the registers in MSP 10 by executing a Sense/Load MSP REGs instruction in CP 300 are shown in FIG. 9. The Write MSP REGs signal is generated only for the Load MSP REGs instruction and the Clock SDR signal is generated only when executing a Sense MSP REGs instruction.

From the foregoing it is seen that the invention can be incorporated into a modified IBM System/32 processor. It is also seen that the invention can be incorporated into a multiprocessor computer system. Further it is seen that the register control instruction provides expanded register addressing capability with minimal additional logic. It is seen that the register control instruction utilizes much of the logic used for execution of the storage control instruction. The address which would normally address storage is used instead to address a set of control or status registers and data is transferred to or from the selected register according to other control information in the register control instruction during the storage operation which is taking place without storage being accessed. The address for selecting the register to be sensed or loaded is decremented by modifying the bit state of the bit indicating that the instruction is a register control instruction instead of a storage control instruction. The modified bit state is fed back into the circuitry normally used to decrement the storage address.

What is claimed is:

1. In a stored program computer an addressable storage containing data and instructions, said instructions including storage access instructions and register access instructions,
    instruction decode means connected to receive from said storage storage access and register access instructions and responsive to said storage access instructions for generating storage control signals and responsive to said register access instructions for generating register control signals,
    a plurality of addressable registers for storing data,
    a source of addresses,
    addressing means connected to receive addresses from said source of addresses and selectively operable under control of storage control signals to address said storage and under control of register control signals to address said registers,
    and means for applying said storage control signals and said register control signals to said addressing means whereby said storage is addressed upon said instruction decode means decoding a storage access instruction and said registers are addressed upon said instruction decode means decoding a register access instruction.

2. The stored program computer of claim 1 wherein said storage access and said register access instructions have common operation codes and at least one address modification control bit for controlling modification of addresses from said source of addresses, the bit state of said at least one address modification control bit of said register access instruction being opposite to the bit state of said at least one address modification control bit of said storage access instruction so as to provide said instruction decode means with at least one condition for distinguishing a register access instruction from a storage access instruction.

3. The stored program computer of claim 2 further comprising:
    means connected to said source of addresses and responsive only to the bit state of said at least one address modification control bit of said storage access instruction to modify an address from said source of addresses and means responsive to said instruction decode means generating a register control signal upon decoding a register access instruction for converting the bit state of said at least one address modification control bit of said register access instruction to the bit state of said at least one address control bit of said storage access instruction.

4. The stored program computer system of claim 1 wherein the origin of data to be entered into the addressed storage location or the addressed register is specified by local storage register address fields contained in said storage access and register access instructions and further comprising:
    addressable local storage registers, local storage register addressing means connected to address said local storage registers in response to receiving addresses from said address fields contained in said storage access and register access instructions, and
    means for selectively transferring addresses from said address fields contained in said storage access and register access instructions to said local storage register addressing means.

5. In a stored program computer system having addressable storage and addressable registers, a source of addresses, addressing means connected to receive addresses from said source of addresses and selectively operable to address said addressable storage or said addressable registers, circuitry for incrementing or decrementing addresses from said source of addresses, said system including storage control and register control instructions stored at addressable locations in said addressable storage, said register control and storage control instructions each having a plurality of bits with storage control instruction decode circuitry responsive to storage control instructions and register control instructions for generating storage control signals, the improvement comprising register control instruction decode apparatus connected to receive at least one of said storage control signals generated by said storage control instruction decode circuitry and responsive to said at least one of said storage control signals generated by said storage control instruction decode circuitry and to predetermined bits in said register control instruction to generate a signal for causing said addressing means to address said addressable registers instead of said addressable storage.

6. The computer system of claim 5 further comprising:
means for converting the state of one of said predetermined bits and feeding the converted bit back into said storage control instruction decode circuitry to cause the same to generate address increment or address decrement signals depending upon the state of the converted bit.

7. In a stored program computer system having addressable storage and addressable registers, a source of addresses, addressing means connected to receive addresses from said source of addresses and selectively operable to address said addressable storage or said addressable registers, circuitry for incrementing or decrementing addresses from said source of addresses, said system including control instructions stored at addressable locations in said addressable storage and having at least one bit where said one bit can be in a first or second state for controlling selective operation of said addressing means, the improvement comprising:
instruction decode means responsive to said at least one bit in said control instructions to cause said addressing means to address said addressable register instead of said addressable storage when said at least one bit is in said first state and to cause said addressing means to address said addressable storage instead of said addressable registers when said at least one bit is in said second state.

8. The computer system of claim 7 wherein said circuitry for incrementing or decrementing addresses is connected to operate under control of said at least one bit being in said second state.

9. The computer system of claim 8 further comprising:
means for converting the state of said at least one bit from said first to said second state to enable address incrementing or decrementing during the register addressing operation.

* * * * *